US010600367B2

(12) United States Patent
Chen et al.

(10) Patent No.: US 10,600,367 B2
(45) Date of Patent: Mar. 24, 2020

(54) METHOD FOR DRIVING DISPLAY DEVICE

(71) Applicant: AU Optronics Corporation, Hsin-Chu (TW)

(72) Inventors: Chien-Jen Chen, Hsin-Chu (TW); Yi-Yo Dai, Hsin-Chu (TW); Tsang-Hong Wang, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/924,751

(22) Filed: Mar. 19, 2018

(65) Prior Publication Data

US 2019/0180689 A1 Jun. 13, 2019

(30) Foreign Application Priority Data

Dec. 12, 2017 (TW) ............................ 106143599 A

(51) Int. Cl.
*G06F 1/00* (2006.01)
*G09G 3/3266* (2016.01)
*G09G 3/3225* (2016.01)
*G09G 3/30* (2006.01)

(52) U.S. Cl.
CPC ............ *G09G 3/3266* (2013.01); *G09G 3/30* (2013.01); *G09G 3/3225* (2013.01); *G09G 2300/0439* (2013.01); *G09G 2300/08* (2013.01); *G09G 2300/0861* (2013.01); *G09G 2310/08* (2013.01); *G09G 2320/064* (2013.01); *G09G 2320/0626* (2013.01); *G09G 2330/021* (2013.01); *G09G 2360/145* (2013.01)

(58) Field of Classification Search
CPC ........... G09G 3/3266; G09G 5/10; G09G 3/30
See application file for complete search history.

(56) References Cited

U.S. PATENT DOCUMENTS

2011/0193892 A1* 8/2011 Eom .................... G09G 3/3266 345/690
2017/0116926 A1* 4/2017 Bong .................. G09G 3/3266
2017/0140700 A1* 5/2017 Yamamoto ............... G09G 3/30
2017/0206837 A1 7/2017 Jeon

FOREIGN PATENT DOCUMENTS

CN 106981270 A 7/2017

OTHER PUBLICATIONS

Taiwan Patent Office, "Office Action" dated Jul. 3, 2018, Taiwan.

* cited by examiner

*Primary Examiner* — Michael A Faragalla
(74) *Attorney, Agent, or Firm* — WPAT, PC

(57) ABSTRACT

A method for driving a display device is provided. The display device includes a first driving circuit and a pixel array. The driving method includes the following step. In a first mode, by using the first driving circuit, a first light emission start signal is received to drive the pixel array. The first light emission start signal includes a plurality of first pulses, and duration of each of the first pulses is respectively overlapped with at least a part of a period of each of a first frame and at least one second frame. In a second mode, by using the first driving circuit, a second light emission start signal is received to drive the pixel array. The second light emission start signal includes a second pulse. Duration of the second pulse is overlapped with at least a part of a period of the first frame, and the second light emission start signal remains at a first level in a period of the at least one second frame.

14 Claims, 5 Drawing Sheets

METHOD FOR DRIVING DISPLAY DEVICE

BACKGROUND

Technical Field

Content of this disclosure relates to a display technology, and in particular, to a method for driving a display device.

Related Art

When a display operates in a frame skip mode, usually, a light emission start signal and a light emission clock signal that are received by a driving circuit still are switched in each frame period. As a result, it is difficult to effectively reduce the total power consumption.

SUMMARY

An aspect of the content of this disclosure is to provide a method for driving a display device. The display device includes a first driving circuit and a pixel array. The driving method includes the following step. In a first mode, by using the first driving circuit, a first light emission start signal is received to drive the pixel array. The first light emission start signal includes a plurality of first pulses, and duration of each of the first pulses is respectively overlapped with at least a part of a period of each of a first frame and at least one second frame. In a second mode, by using the first driving circuit, a second light emission start signal is received to drive the pixel array. The second light emission start signal includes a second pulse. Duration of the second pulse is overlapped with at least a part of a period of the first frame, and the second light emission start signal remains at a first level in a period of the at least one second frame.

In conclusion, the display device in the content of this disclosure may operate in the first mode (that is, a general display mode) and the second mode (a frame skip mode). When operating in the second mode, the display device may integrate several first pulses of the first light emission start signal in the periods of the first frame and the at least one second frame in the first mode to the second pulse of the second light emission start signal that corresponds to the first frame in the second mode, so as to effectively maintain luminance representation and reduce power consumption.

The foregoing descriptions are described in detail below with reference to implementations, and the technical solutions of the content of this disclosure are further explained.

BRIEF DESCRIPTION OF THE DRAWINGS

To make the foregoing and other objectives, features, advantages, and embodiments of the content of this disclosure more comprehensible, the accompanying drawings are described below.

DETAILED DESCRIPTION

Many different embodiments or examples are provided in the following disclosure to implement the features of the content of this disclosure. This disclosure may possibly repeatedly cite numeric characters and/or letters in different examples. These repetitions are for the purposes of simplicity and descriptions, and do not specify the relationships between different embodiments and/or configurations in the following discussions.

In the implementations and the claims, unless specially defined in the content, articles "a" and "the" may extensively indicate one or multiple. It should be further understood that the words "include", "comprise", and "have" and similar words used herein indicate the disclosed features, areas, integers, steps, operations, elements, and/or components, but do not exclude one or more of the or additional other features, areas, integers, steps, operations, elements, components, and/or combinations thereof.

Both "coupling" and "connection" used herein may refer to that two or more elements directly serve as entities or are in electrical contact with each other, or are connected to each other to serve as an entity or are in electrical contact, and the "coupling" or "connection" may further refer to that the two or more elements operate or act with each other. Relatively, when an element is referred to as being "directly connected to" or "directly coupled to" another element, there are no additional elements therebetween.

The term "approximately", "about", or "substantially approximately" used herein usually refers to that an error or a range of a value is approximately within 20 percents, is preferably within approximately 10 percents, and is more preferably within approximately five percents. Unless explicitly described herein, all values referred herein are considered to be approximations, that is, the error or range indicated by the term "approximately", "about", or "substantially approximately".

Figure 1:
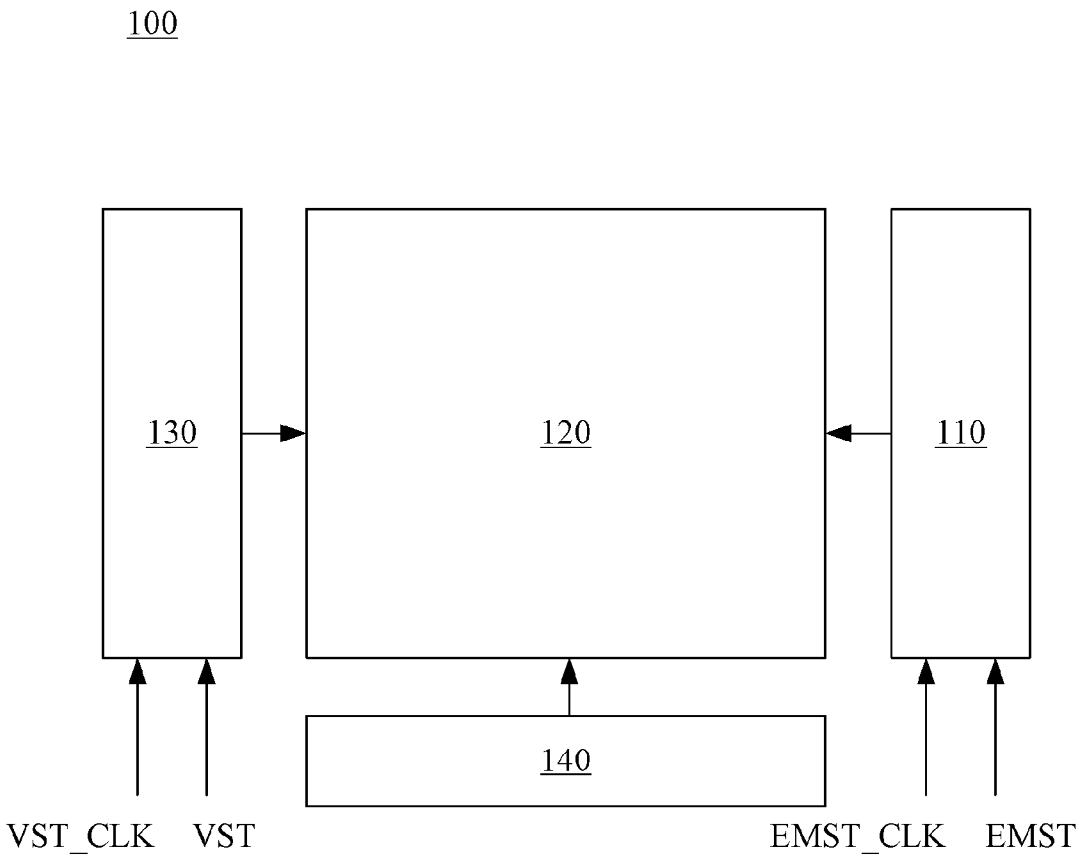
FIG. 1 is a schematic diagram of a display device according to an embodiment of the content of this disclosure.

Referring to FIG. 1, FIG. 1 is a schematic diagram of a display device 100 according to an embodiment of the content of this disclosure. The display device 100 includes driving circuits 110, 130, and 140 and a pixel array 120. In an embodiment, the driving circuits 110 and 130 may be gate on array (GOA) circuits, and the driving circuit 140 may be a source driving circuit. As shown in FIG. 1, the driving circuit 110 is disposed on one side of the pixel array 120, and the driving circuit 130 is disposed on another side of the pixel array 120 with respect to the driving circuit 110, but the content of this disclosure is not limited thereto. In another embodiment, the driving circuits 110 and 130 may be disposed on a same side of the pixel array 120. The driving circuit 110 is configured to receive a light emission start signal EMST and a light emission clock signal EMST_CLK to drive the pixel array 120. The driving circuit 130 is configured to receive a scanning start signal VST and a scanning clock signal VST_CLK to drive the pixel array 120.

Figure 2:
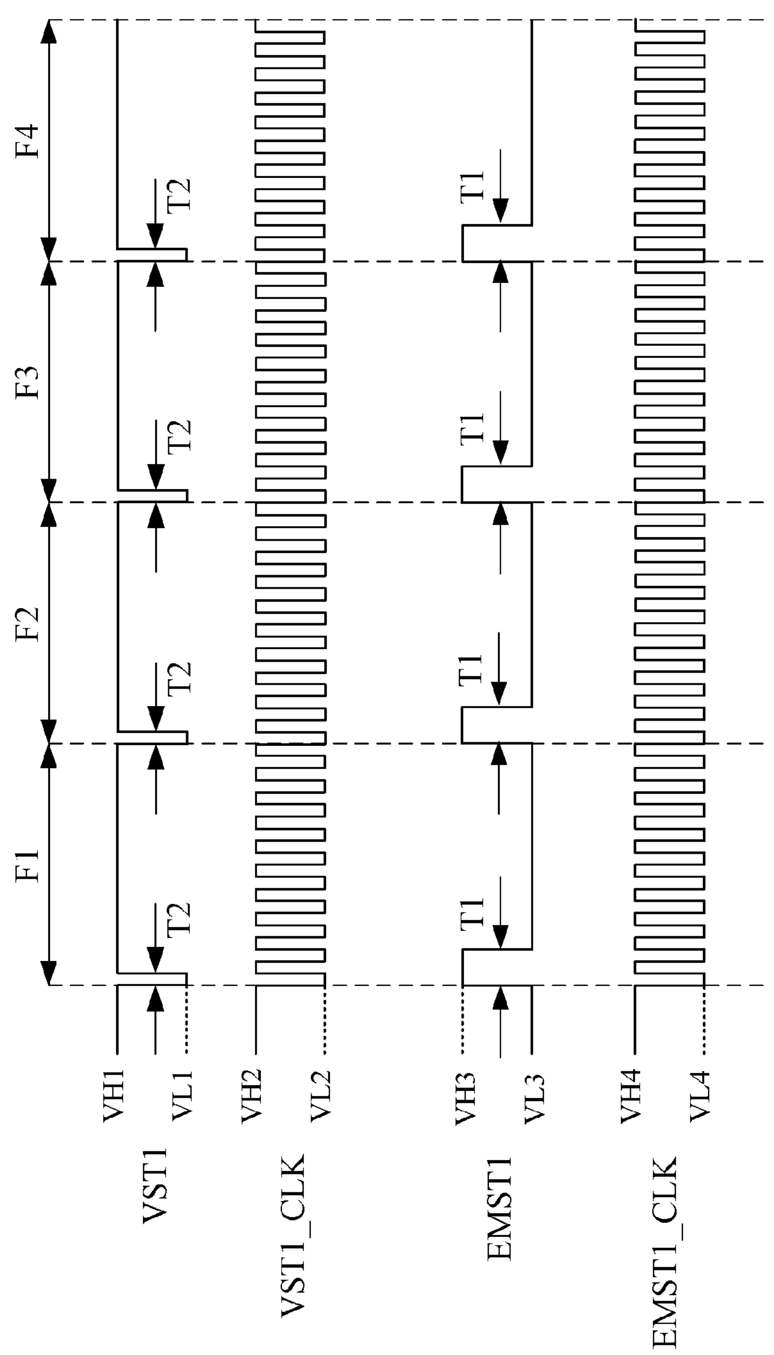
FIG. 2 is a schematic diagram of a time sequence of a scanning start signal, a scanning clock signal, a light emission start signal, and a light emission clock signal according to an embodiment of the content of this disclosure.

In operation, reference may be made to both FIG. 1 and FIG. 2. FIG. 2 is a schematic diagram of a time sequence of a scanning start signal VST1, a scanning clock signal VST1_CLK, a light emission start signal EMST1, and a light emission clock signal EMST1_CLK according to an embodiment of the content of this disclosure. In a first mode (for example, a general display mode), the driving circuit 110 receives the light emission start signal EMST1 and a light emission clock signal EMST1_CLK to drive the pixel array 120; and the driving circuit 130 receives a scanning start signal VST1 and a scanning clock signal VST1_CLK to drive the pixel array 120. It should be noted that the scanning start signal VST1 includes a plurality of pulses, and duration T2 of each of the pulses is respectively within a period of each of the frames F1 to F4. The light emission start signal EMST1 includes a plurality of pulses, and duration T1 of each of the pulses is respectively overlapped with at least a part of the period of each of the frames F1 to F4. For example, in the frame F1, the pulse duration T1 of the light emission start signal EMST1 is approximately 10% of the period of the frame F1. Similarly, in the periods of the frames F2 to F4, the pulse duration T1 of the light emission start signal EMST1 is respectively approximately 10% of each of the periods of the frames F2 to F4.

Regarding the scanning clock signal ST1_CLK and the light emission clock signal EMST1_CLK in the first mode, in the periods of the frames F1 to F4, the scanning clock signal VST1_CLK is repeatedly switched to a high level VH2 and a low level VL2, and the light emission clock signal EMST1_CLK is repeatedly switched to a high level VH4 and a low level VL4.

In this embodiment, descriptions are made by using the frame F1 as an example. The driving circuits 110 and 130 are GOA circuits of a P-type thin film transistor. Therefore, a part that is of the scanning start signal VST1 and that is at a high level VH1 is a disabling signal, and a part that is of the scanning start signal VST1 and that is at a low level VL1 in the frame F1 is an enabling signal. Similarly, a pulse that is of the light emission start signal EMST1 and that is at a high level VH3 is a disabling signal, and a part that is of the light emission start signal EMST1 and that is at a low level VL3 in the frame F1 is an enabling signal. However, the content of this disclosure is not limited thereto.

Figure 3:
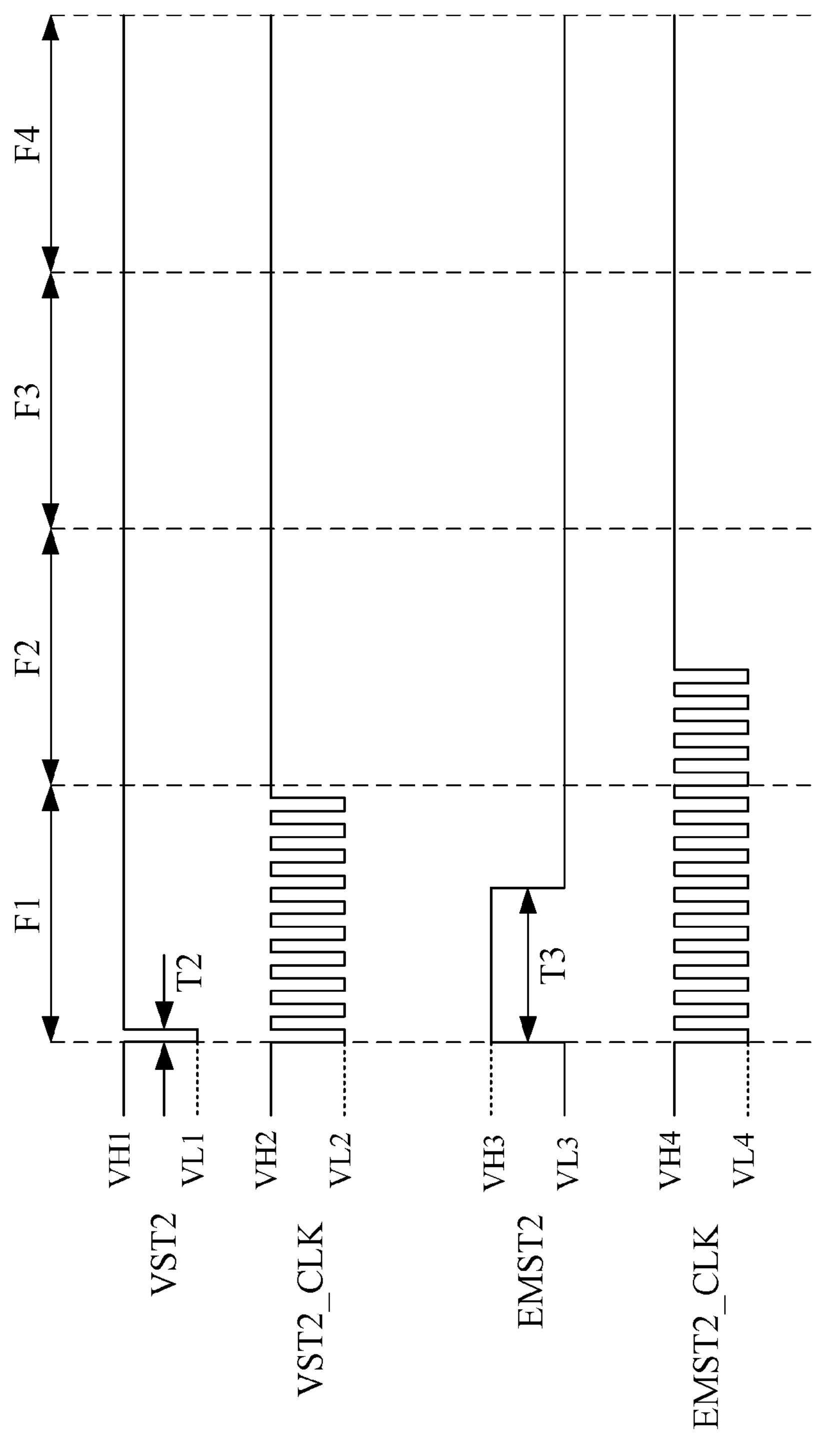
FIG. 3 is a schematic diagram of a time sequence of a scanning start signal, a scanning clock signal, a light emission start signal, and a light emission clock signal according to an embodiment of the content of this disclosure.

Referring to both FIG. 1 to FIG. 3, FIG. 3 is a schematic diagram of a time sequence of a scanning start signal VST2, a scanning clock signal VST2_CLK, a light emission start signal EMST2, and a light emission clock signal EMST2_CLK according to an embodiment of the content of this disclosure. In a second mode (for example, a frame skip mode), the driving circuit 110 receives the light emission start signal EMST2 and a light emission clock signal EMST2_CLK to drive the pixel array 120; and the driving circuit 130 receives a scanning start signal VST2 and a scanning clock signal VST2_CLK to drive the pixel array 120.

It should be noted that the scanning start signal VST2 includes one pulse. Duration T2 of the pulse is within the period of the frame F1, and the scanning start signal VST2 remains at the high level VH1 in the periods of the frames F2 to F4. In other words, in the second mode, the frame F1 keeps operating normally to update images; and the frames F2 to F4 are skipped and do not update images. Therefore, power consumption may be reduced, and a frequency of the second mode is reduced to be a quarter of that of the first mode. However, the content of this disclosure is not limited thereto. The light emission start signal EMST2 includes one pulse. Duration T3 of the pulse is overlapped with at least a part of the period of the frame F1, and the light emission start signal EMST2 remains at the low level VL3 in the periods of the frames F2 to F4. It should be noted that the pulse duration T1 of the light emission start signal EMST1 is separately approximately 10% of each of the periods of the frames F1 to F4. Therefore, the pulse duration T3 of the light emission start signal EMST2 may be 10% of a total period of the frames F1 to F4. In other words, in this embodiment, the pulse duration T3 of the light emission start signal EMST2 is a sum of the duration T1 of all pulses of the light emission start signal EMST1 (that is, T3=4*T1).

Regarding the scanning clock signal VST2_CLK and the light emission clock signal EMST2_CLK in the second mode, in the period of the frame F1, the scanning clock signal VST2_CLK is repeatedly switched to the high level VH2 and the low level VL2; and in the periods of the frames F2 to F4, the scanning clock signal VST2_CLK remains at the high level VH2. In another aspect, the light emission clock signal EMST2_CLK starts to be repeatedly switched to the high level VH4 and the low level VL4 in the period of the frame F1, and is continuously and repeatedly switched to the high level VH4 and the low level VL4 until data corresponding to the frame F1 is transferred to the pixel array 120. After the data corresponding to the frame F1 is transferred to the pixel array 120, the light emission clock signal EMST2_CLK remains at the high level VH4 until the frame F4 ends.

In this way, compared with the first mode, the display device 100 in the second mode may integrate several pulses (duration T1) of the light emission start signal EMST1 in the periods of the frames F1 to F4 in the first mode to a pulse (the duration T3) of the light emission start signal EMST2 that corresponds to the frame F1 in the second mode, and shorten an output of the light emission clock signal EMST2_CLK in the periods of the frames F2 to F4 that are skipped, so as to effectively maintain luminance representation in the periods of the frames F1 to F4 and reduce the power consumption.

It should also be noted that the foregoing high levels VH1, VH2, VH3, and VH4 may be a same voltage level or different voltage levels, and the low levels VL1, VL2, VL3, and VL4 may be a same voltage level or different voltage levels.

Figure 4:
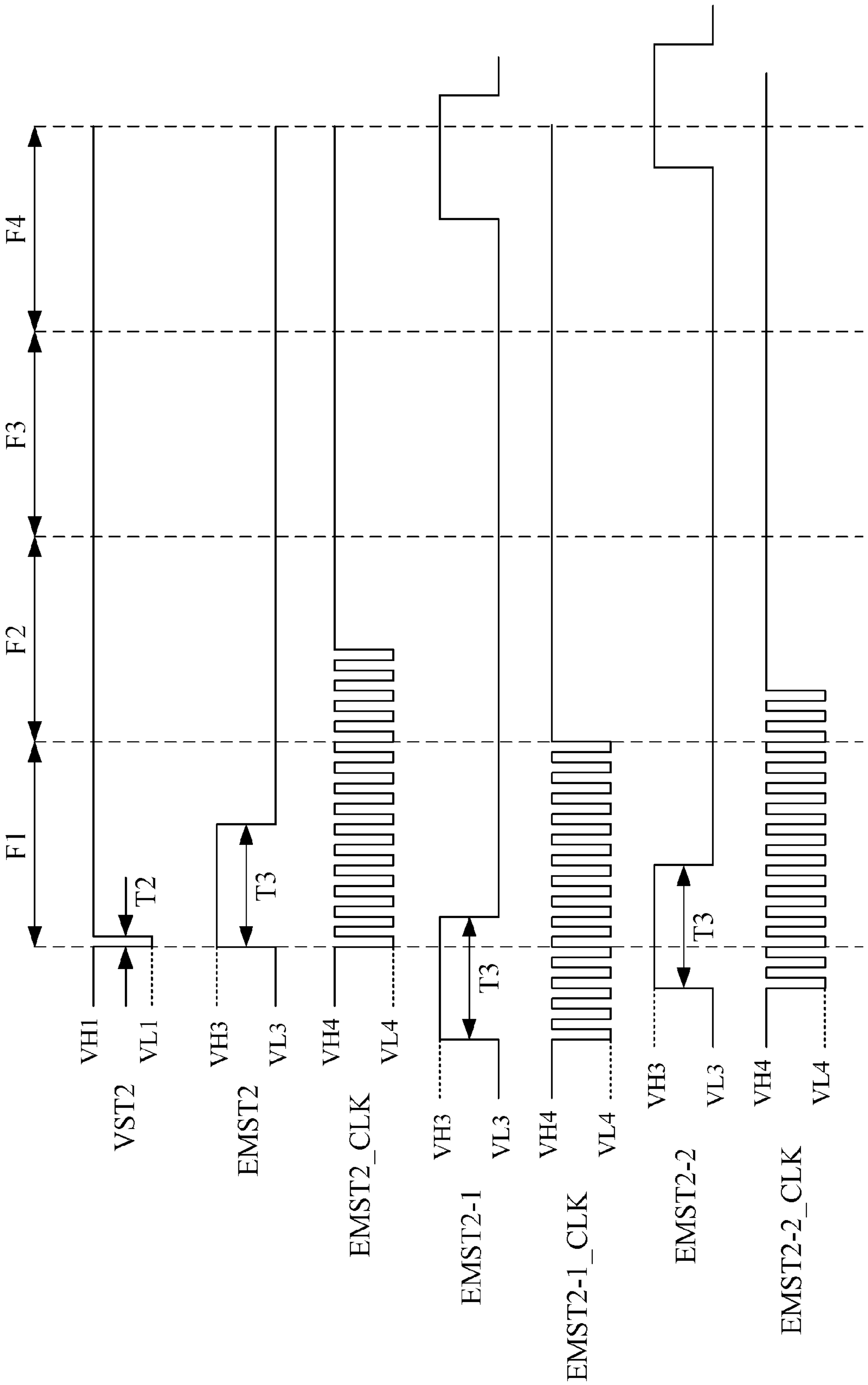
FIG. 4 is a schematic diagram of a time sequence of a scanning start signal, a light emission start signal, and a light emission clock signal according to an embodiment of the content of this disclosure.

Alternatively, in another embodiment, time sequences of the light emission start signal EMST2 and the light emission clock signal EMST2_CLK may be adjusted. As shown in FIG. 4, rising edges of the pulses of the light emission start signals EMST2-1 and EMST2-2 precede the period of the frame F1. Because the duration T3 of the pulse of the light emission start signal EMST2 is within the period of the frame F1, the pulses of the light emission start signals EMST2-1 and EMST2-2 precede the light emission start signal EMST2. It should be noted that in this embodiment, each duration T3 of the pulses of the light emission start signals EMST2, EMST2-1, and EMST2-2 is overlapped with the duration T2 of the pulse of the scanning start signal VST2.

Figure 5:
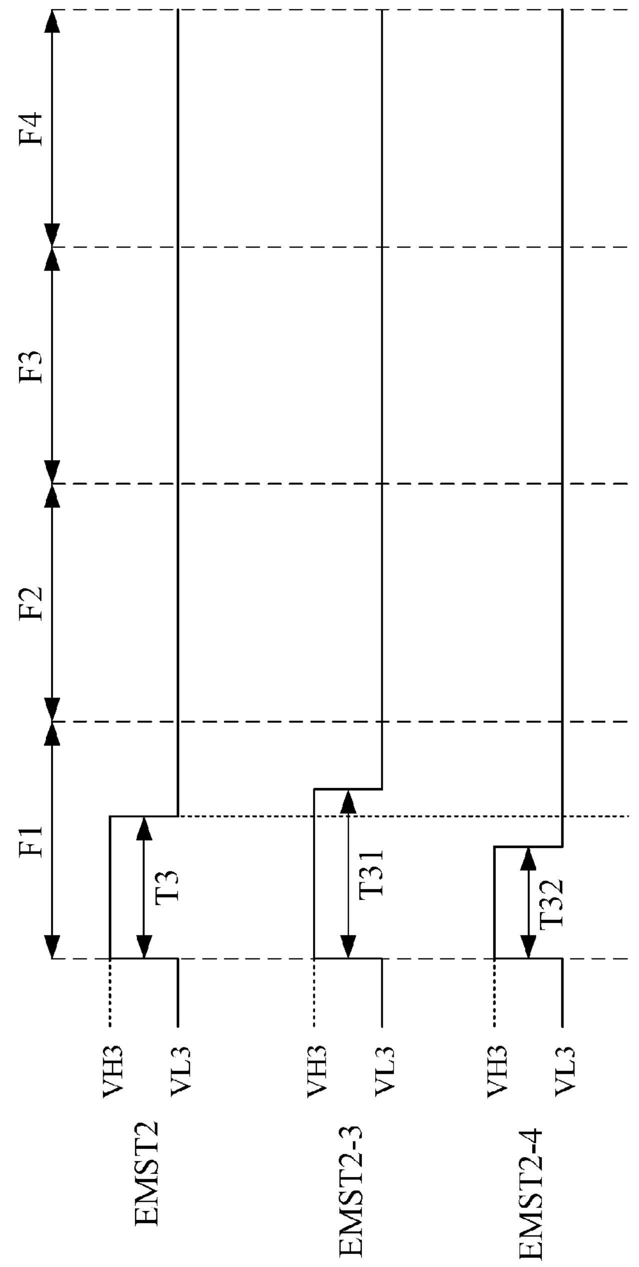
FIG. 5 is a schematic diagram of a time sequence of a light emission start signal according to an embodiment of the content of this disclosure.

Alternatively, in another embodiment, to achieve good luminance representation, the display device 100 may detect a luminance of the pixel array 120 to adjust a width of the duration T3 of the pulse of the light emission start signal EMST2. For example, when the luminance of the pixel array 120 is greater than a first luminance threshold value (may be flexibly designed as a luminance threshold value of being excessively bright according to actual requirements), duration of a pulse of a light emission start signals EMST2-3 is prolonged to time T31, as shown in FIG. 5. For another example, when the luminance of the pixel array 120 is less than a second luminance threshold value (may be flexibly designed as a luminance threshold value of being excessively dark according to actual requirements), duration of a pulse of a light emission start signals EMST2-4 is shortened to time T32, as shown in FIG. 5. It should be noted that the first luminance threshold value and the second luminance threshold value may be the same or different.

In conclusion, the display device 100 in the content of this disclosure may operate in the first mode (that is, the general display mode) and the second mode (that is, the frame skip mode). When operating in the second mode, the display device 100 may integrate several pulses (the duration T1) of the light emission start signal EMST1 in the periods of the frames F1 to F4 in the first mode to a pulse (the duration T3) of the light emission start signal EMST2 that corresponds to the frame F1 in the second mode, and shorten the output of the light emission clock signal EMST2_CLK in the periods of the frames F2 to F4 that are skipped, so as to effectively maintain the luminance representation in the periods of the frames F1 to F4 and reduce the power consumption.

Although this application discloses the foregoing by using implementations, the foregoing is not intended to limit this application. Any person skilled in the art may make various variations and modifications without departing from the spirit and scope of this application. Therefore, the protection scope of this application should fall within the scope defined by the appended claims below.

What is claimed is:

1. A driving method for driving a display device, wherein the display device comprises a first driving circuit and a pixel array, and the driving method comprises:

a first mode, receiving a first light emission start signal via the first driving circuit to drive the pixel array, wherein the first light emission start signal comprises a first pulse with a first duration and a second pulse with the first duration, wherein the first pulse overlaps at least partially with a first frame, and the second pulse overlaps a least partially with a second frame; and a second mode, receiving a second light emission start signal via the first driving circuit to drive the pixel array, wherein the second light emission start signal comprises a third pulse at a second light emission signal level with a second duration overlapped at least partially with the first frame, and the second light emission start signal remains at a first light emission signal level in a period of the second frame, wherein the first light emission signal level and the second light emission signal level are different.

2. The driving method according to claim 1, wherein the display device further comprises a second driving circuit, and the second mode further comprises:

receiving a scanning start signal and a scan clock signal via the second driving circuit to drive the pixel array, wherein the scanning start signal comprises a fourth pulse within the first frame, the scanning start signal remains at a second scanning signal level in the second frame, the scan clock signal alternates between a first scan clock level and a second scan clock level in the first frame, and the scan clock signal remains at the scan second clock level in the second frame.

3. The driving method according to claim 1, the second mode further comprising:

receiving a light emission clock signal via the first driving circuit to drive the pixel array, wherein the light emission clock signal alternates between a first light emission clock level and a second light emission clock level in the first frame until data corresponding to the first frame is transferred to the pixel array, and then the light emission clock signal remains at the first light emission clock level for at least an entirety of a subsequent frame.

4. The driving method according to claim 2, wherein the third pulse is overlapped with the fourth pulse.

5. The driving method according to claim 4, wherein a rising edge of the third pulse precedes the first frame.

6. The driving method according to claim 4, wherein the second duration is within the first frame.

7. The driving method according to claim 1, the second mode further comprising:

detecting a pixel array luminance for adjusting the second duration of the second pulse.

8. The driving method according to claim 1, wherein the second mode further comprises:

prolonging the second duration when the pixel array luminance is greater than a luminance threshold value.

9. The driving method according to claim 7, wherein the second mode comprises:

shortening the second duration when the pixel array luminance is less than a luminance threshold value.

10. The driving method according to claim 1, further comprising:

receiving a light emission clock signal via the first driving circuit to drive the pixel array, wherein under the first mode, after the first pulse and before the second pulse, the light emission clock signal alternates N times between a first light emission clock level and a second light emission clock level, and under the second mode, the light emission clock signal alternates N times between the first light emission clock level and the second light emission clock level before remaining at the first light emission clock level.

11. The driving method according to claim 1, wherein the first pulse, the second pulse, and the third pulse are all high level signals.

12. The driving method according to claim 2, wherein the fourth pulse is a low level signal.

13. A driving method for driving a display device, wherein the display device comprises a first driving circuit, a second driving circuit, and a pixel array, and the driving method comprises:

a first mode, receiving a first light emission start signal and a first plurality of light emission clock signals via the first driving circuit to drive the pixel array, wherein the first light emission start signal comprises a first pulse with a first duration and a second pulse with the first duration, wherein the first pulse overlaps at least partially with a first frame, and the second pulse overlaps a least partially with a second frame; and a second mode, receiving a second light emission start signal and the plurality of light emission clock signals via the first driving circuit, and receiving a scan start signal and a plurality of scan clock signals via the second driving circuit to drive the pixel array, wherein the second light emission start signal comprises a third pulse with a second duration overlapped at least partially with the first frame, the second light emission start signal remains at a first light emission signal level in a period of the second frame, the light emission clock signals pauses after the second frame starts, and the scan clock signals pause before the second frame starts.

14. A driving method for driving a display device, wherein the display device comprises a first driving circuit and a pixel array, and the driving method comprises:

a first mode, receiving a first light emission start signal and a plurality of light emission clock signals via the first driving circuit to drive the pixel array, wherein the first light emission start signal comprises a first pulse with a first duration and a second pulse with the first duration, wherein the first pulse overlaps at least partially with a first frame, and the second pulse overlaps a least partially with a second frame; and a second mode, receiving a second light emission start signal and the plurality of light emission clock signals via the first driving circuit to drive the pixel array, wherein the second light emission start signal comprises a third pulse with a second duration overlapped at least partially with the first frame, the second light emission start signal remains at a first light emission signal level in a period of the second frame, and the second duration equals to a value of the first duration multiplying (N+1) frames, and N is a number of frames been skipped under the second mode.

* * * * *